UNITED STATES PATENT OFFICE.

HENRY WURTZ, OF NEW YORK, N. Y.

PREPARING BARRELS TO HOLD OIL, PETROLEUM, &c.

Specification forming part of Letters Patent No. 46,518, dated February 21, 1865.

*To all whom it may concern:*

Be it known that I, HENRY WURTZ, of New York, in the county of New York, in the State of New York, have invented new and Improved Methods of Preparing Wooden Barrels and other Vessels to Hold Oils; and I do hereby declare that the following is a full and exact description thereof.

The nature of my invention consists, first, in introducing into the pores of the wood or other materials of barrels or other vessels water containing in solution one or more of those saline substances known to chemisty as "deliquescent salts," preferring the salt known as "chloride of calcium;" second, in subsequently applying to the surface of the wood certain other agents which have the power of decomposing this deliquescent salt and converting it into an insoluble compound, thus divesting the wood of its superficial dampness, while its interior substance is still saturated with an aqueous fluid, this insoluble compound preventing at the same time the removal of the aqueous fluid from its interior substance by the solvent action either of water mixed with the contained oil or of rain or other external aqueous agency; third, in uniting the joints of barrels and other vessels, and sometimes coating the interior surfaces of such vessels with a plastic elastic paste impermeable to oils, made by melting in a solution of a deliquescent salt some substance of a gelatinous, glutinous, mucilaginous, farinaceous, gummy, or starchy nature.

To enable others skilled in the art to apply and use my invention, I shall proceed to describe my modes of preparation and operation.

The solution of chloride of calcium may be prepared by any one of the known methods, preferably on a large scale, by passing the waste muriatic-acid gas proceeding from the manufacture of sulphate of soda from common salt through a column of loose blocks of limestone over which water is made to trickle; and on a smaller scale from the muriatic acid of commerce, using, if possible, that which is free from sulphurous and sulphuric acids and iron, and preferring that of about 18° to 20° Baumé, corresponding to a specific gravity of from 1.14 to 1.16, and containing from 28.5 to 32.25 per cent. of dry muriatic acid. One pound of such acid corresponds to from 0.4333 to 0.4904 pound of dry chloride of calcium. Such acid may be saturated with marble-dust or chalk, but far better, to avoid the great effervescence, (which in operating on a large scale gives rise to much waste of material and of time,) with slaked lime, as pure as possible, mixed with water to the consistence of thick cream, and added in small portions at a time with agitation. During this operation great heat is disengaged, and time must be allowed for this heat to subside, or much loss of acid will ensue and an ebullition of a violent and almost explosive character may even occur.

It is better to introduce small quantities of lime and of acid successively into the same vessel, keeping the lime always slightly in excess; or, better still, two streams, one of acid and one of cream of lime, may be kept constantly flowing together into the same vessel, or into one end of a long wooden trough, out of the other end of which runs the solution of chloride of calcium formed.

The heat produced may be greatly moderated by first diluting the acid with some cold concentrated solution of the chloride of calcium, itself the product of a previous operation. The excess of hydrate of lime used should be small, as such excess carries down with it some of the chloride of calcium in the form of an almost insoluble compound of lime and chloride of calcium, which contains three equivalents of the former to one of the latter. For this reason, should a large excess have been added in any operation, through accident or mistake, the sediment should be saved and used in the preparation of a new portion of the solution. A small excess is always necessary in order to precipitate any sulphuric or sulphurous acid, iron, or magnesia which may be present. The finished solution is allowed to settle, and then drawn off clear from the sediment. If acid of 20° Baumé has been used, and the slaked lime has been of the consistence of thick cream, the solution of chloride of calcium obtained will have a specific gravity of about 1.20, and will contain from two to two and one-fourth pounds of dry chloride to the gallon—a very desirable strength for the operations described below.

I prefer to operate with such a solution of chloride of calcium upon green wood—that is, wood that has never undergone the seasoning process, and which still contains the sap—such green wood, as is well known, being far more easily impregnated with aqueous solutions than dry or seasoned wood. It has not, however, been heretofore known that all wood, whether green or dry, shrinks or contracts perceptibly in volume on impregnation with solutions of chloride of calcium. The amount of this shrinkage cannot be definitely stated, as it varies with the kind of timber and according to other circumstances; but in calculating the dimensions of staves or other pieces from which barrels or other vessels are to be made it is necessary to make certain allowances for it. In the case of green timber particularly, the degree of this shrinkage is very important. The means of providing against and obviating the detrimental effects of this shrinkage form important elements in my methods. It follows, in the first place, from my discovery of this shrinkage, that it is desirable, whenever possible, to saturate the staves or other pieces from which any vessel to hold oil is to be made (whether these pieces be seasoned or unseasoned) with the chloride-of-calcium solution before they are put together to form the barrel or other vessel. In most cases, however—that is, in every case in which the vessel to be made is a keg, cask, barrel, tank, or cistern, or other vessel consisting of staves held together by hoops—I have found that the wood may be impregnated with the solution of chloride of calcium by filling the vessel itself therewith, applying certain means to cause the solution to penetrate the wood, and, when the latter is sufficiently impregnated, driving on the hoops again, thus filling up the cracks caused by shrinkage.

In case the barrel or other hooped vessel is composed of green staves still retaining the sap, no other means are necessary to cause a sufficient impregnation than filling the vessel completely full of the solution of chloride of calcium and allowing a sufficient time to elapse for the completion of the osmotic or dialytic interchange of the soluble elements of the sap with the chloride of calcium. This time varies with the kind and thickness of wood and other circumstances, and cannot be precisely specified, but is easily determined by experience. In many cases the desired point may be regarded as arrived at when no further leakage ensues arising from contraction of the wood. This criterion, however, is available only when the hoops are kept driven on and tightened from time to time during the operation. Of course it is necessary during this process to keep the vessel constantly filled with the solution by supplying more as fast as it is absorbed. Chloride-of-calcium solution which is used in impregnating green wood in this way becomes, of course, continually weaker by dilution with the fluids of the sap, and must therefore be from time to time concentrated by heat or by addition of solid chloride of calcium until it is brought up again to the requisite specific gravity. After long use, also, it must become impregnated with other salts derived from the sap, which will in some degree impair its efficiency.

In case the barrel or other vessel is composed of dry seasoned wood, a less perfect impregnation may be accomplished in the same way by the occupation of a much longer time; but in this case it is better to introduce the liquid boiling hot and to keep it heated as much as possible during the operation, either by immersing the whole barrel in a hot solution of the chloride, or, better, by simply passing steam into the liquid, the dilution thus occasioned being corrected by the introduction, from time to time, of solid dry or crystallized chloride of calcium. This operation may be further accelerated by closing the vessel air-tight and passing the steam in under some pressure, so as to force the liquid into the pores of the wood. As before, when practicable, the hoops should be kept tightened from time to time to prevent leaking from the shrinkage of the wood.

As before stated, it is desirable in all cases (and in the case of tanks, boats, railroad-cars, and other vessels for oil not composed of staves held together by hoops, and in which the junctions are made by means of nails, screws, cements, &c., it is usually indispensable and generally more convenient) to impregnate the timbers with the solution of chloride of calcium before putting them together. If the pieces of wood are green, they may be immersed immediately in the solution, either hot or cold, and quickly become impregnated; but if dry or seasoned the solution is best used hot.

The corroding action of chloride of calcium solution upon iron is well known. This I have provided for by the discovery that a certain liquid, when mixed in small quantity with the chloride of calcium, totally divests it of this corroding action. This liquid is that which is sometimes improperly called "saccharate of lime," but more properly "sucrate of lime," and is made by dissolving slaked lime to saturation in dilute sirup. In all cases in which the vessels or pieces of wood to be made into vessels are joined or bound together with fastenings of iron, either hoops, nails, screws, or other fastenings, it is advisable to mix with the chloride-of-calcium solution a quantity of this sucrate of lime. One gallon of molasses saturated with lime to each twenty-five or thirty gallons of chloride-of-calcium solution will in general prove sufficient.

To proceed to the second part of my invention—the application to the surface of the wood of other agents which have the power to convert the chloride of calcium into an insoluble compound. There are several agents which have this power, such as solutions of the sulphates, carbonates, phosphates, and silicates of soda and potash. Another such agent which I have found generally applicable, when the oils to be confined contain very much water in admixture, is a solution of stearate of soda, or common hard soap. This is dissolved in hot water in about the proportion of six to eight ounces avoirdupois, or less, of common yellow soap to one gallon of water, and while still warm poured into the barrel, which is then rolled about, so as to cause the liquid to come into contact with every part of its internal surface. A coating of stearate of lime or lime-soap is thus formed over the wood, and the superficial pores of the latter filled up with the same substance. A little precaution is here necessary, because the lime-soap, when first formed, has little consistence or tenacity, and is easily detached by a rapid current of the liquid. The soap solution should therefore be introduced gently and slowly into the bottom of the barrel by means of a funnel with a long neck or a siphon-tube. Instead of rolling the barrel about, which, if not done with care, may detach some of the lime-soap coating, it is better, though more consumptive of time, to fill the barrel entirely full of the soap solution and then draw it off by means of a siphon. The barrel is finally inverted and allowed to drain and remain at rest for twenty-four hours, during which time the coating will be found to have assumed a greater consistence, and it is then ready for the introduction of the oil. I sometimes make the joints between the staves of barrels which have been impregnated with chloride of calcium oil-tight by varnishing the edges of the staves, before putting them together, with a solution of hard soap.

In the case of oils containing little or no water in admixture, in which case it is necessary to deprive the exterior only of the barrel or other vessel of its deliquescent and soluble ingredients, I have found the most efficient and valuable coating for the interior to be a new and highly-adhesive paste which I have invented, and which is prepared as follows: Common rye or wheat flour is made into a very thin magma with a cold concentrated solution of chloride of calcium, passing through a sieve to destroy any lumps. This magma is then heated with constant stirring until it assumes a thick glutinous consistence and semi-transparent aspect. A portion of the starch of the flour is probably converted into dextrine in this operation, and the paste formed is excessively adhesive, while at the same time it has the power of never drying or hardening. I also sometimes combine the advantages of this deliquescent paste and the lime-soap by first applying the paste to the internal surfaces of the staves, then putting the barrel together, and afterward pouring into it a solution of common hard soap, as before described. I use this paste also as a plastic cement, impermeable to oils, for introducing between the staves and joints of barrels and into the joints of other vessels for holding oils. It is clear and obvious that the substitution in this paste of any other kind of flour or meal, or of starch, dextrine, gum, glue, or any other glutinous or mucilaginous substance, will form an equivalent composition and produce substantially similar results, differing only in degree. So, also, the substitution of any other deliquescent salt—such as chloride of magnesium, chloride of aluminum, chloride of zinc, &c.—for the chloride of calcium would produce an equivalent result.

As regards the exterior surfaces of barrels and other vessels, I prefer, in most cases to convert the chloride of calcium into the insoluble compound which it forms with hydrate of lime, and which is mentioned above. This is done simply by whitewashing the exterior of the barrel or other vessel with a very thin whitewash or milk of lime. If desirable, the exterior of the barrel may afterward, when dry, be painted, varnished, or oiled. The coating of the exterior of the barrel, however, is a precaution which will only in special cases be necessary or desirable, for the removal of the chloride of calcium from the impregnated wood is extremely slow and imperfect, even on long exposure to wet.

Another liquid highly adapted for application to the external surfaces is a solution of silicate of soda or soluble glass.

It is clear and obvious that all these methods of impregnating with chloride of calcium, of coating surfaces, and of cementing joints, so as to be impermeable to oil, are applicable to other materials besides wood, and in fact to any material which is porous both to oils and to aqueous solutions—such, for instance, as plaster, paper, porous stones, leather, &c.

It is also clear and obvious that in all the above methods the substitution for the chloride of calcium of chloride of aluminum, chloride of magnesium, chloride of zinc, or other deliquescent saline compound would accomplish similar effects and equivalent results.

Another quality imparted to wood by these methods, and one which is peculiarly valuable in its application to barrels and other vessels for holding petroleum and other inflammable liquids, is incombustibility. The wood is rendered wholly incapable of burning under any circumstances, and must therefore protect, under most circumstances, the inclosed oil from inflammation. The wood is also preserved from decay by these means, and its strength, toughness, and flexibility are greatly increased.

Another important advantage secured by these methods is the great saving of time and expense in seasoning wood for oil-barrels, as green wood, during its impregnation with a solution of chloride of calcium, undergoes all the contraction in volume of which it is susceptible, and becomes, so far as any liability to subsequent contraction is concerned, to all intents and purposes thoroughly seasoned.

What I claim as my invention, and desire to secure by Letters Patent, is—

1. The introduction into the pores of wood and other porous materials, when used as materials for barrels or other vessels for holding oils, of aqueous solutions of deliquescent salts, as above set forth.

2. The subsequent superficial application to such substances of agents which convert the deliquescent salts into insoluble compounds, as above set forth.

3. The method of preparing barrels and other vessels composed of wooden staves bound by hoops for holding oils, by filling them with deliquescent saline solutions and tightening the hoops as the wood shrinks by absorption of the liquid, as above set forth.

4. The prevention of the corrosion of iron hoops, nails, and other iron fastenings of barrels and other vessels for holding oils, when impregnated with solutions of deliquescent salts, by adding to such solutions sucrate of lime, as above set forth.

5. The application to the internal surfaces and between the joints of barrels and other vessels for holding oil of a paste composed of a deliquescent saline solution combined with some substance of a gelatinous, glutinous, mucilaginous, farinaceous, gummy, or starchy nature, as above set forth.

HENRY WURTZ.

Witnesses:
JOHN S. HOLLINGSHEAD,
JOHN D. BLOOR.